United States Patent [19]

Alexander et al.

[11] Patent Number: 5,554,401
[45] Date of Patent: Sep. 10, 1996

[54] HIGH MOISTURE COLLAGEN CASINGS

[75] Inventors: Graeme Y. Alexander, Killearn; Trevor F. Morgan, Airdrie; Gerald P. Fitzpatrick, North Kelvinside Glasgow, all of United Kingdom

[73] Assignee: Devro Limited, Glasgow, United Kingdom

[21] Appl. No.: 403,872

[22] PCT Filed: Oct. 1, 1993

[86] PCT No.: PCT/GB93/02045

§ 371 Date: May 9, 1995

§ 102(e) Date: May 9, 1995

[87] PCT Pub. No.: WO94/07372

PCT Pub. Date: Apr. 14, 1994

[51] Int. Cl.[6] ................................................. A22C 13/00
[52] U.S. Cl. ..................................... 426/140; 426/277
[58] Field of Search .............................. 426/140, 277; 138/118.1; 428/34.8

[56] References Cited

U.S. PATENT DOCUMENTS

| 3,235,641 | 2/1966 | McKnight et al. | 264/178 |
| 3,930,035 | 12/1975 | Burke et al. | 426/140 |

FOREIGN PATENT DOCUMENTS

| 0083126 | 12/1982 | European Pat. Off. . |
| 2172273 | 9/1973 | France . |
| 54147968 | 5/1978 | Japan . |
| 1406015 | 2/1972 | United Kingdom . |
| 2019344 | 10/1979 | United Kingdom . |

*Primary Examiner*—Arthur L. Corbin
*Attorney, Agent, or Firm*—Pennie & Edmonds

[57] ABSTRACT

A wet edible collagen casing, having a moisture content of 50 to 90% by weight, which has been formed and cross-linked, and is packed in its wet state.

10 Claims, 2 Drawing Sheets

HIGH MOISTURE COLLAGEN CASINGS

TECHNICAL FIELD

The invention relates to edible collagen casings for foodstuffs, particularly for sausages; and to the production thereof.

BACKGROUND

Collagen casings are widely used and have certain advantages over natural casings produced from sheep or hog intestines. Thus, collagen casings are of uniform diameter and strength and have a good finish. However, they do not look the same nor do they handle in the same way as natural casings. Some users prefer the appearance and feel of natural casings. However, because natural casings come in short lengths, processing costs are high, their mechanical strength may be unreliable and the use of natural casings is labour-intensive and costly.

Collagen casings are conventionally produced in the wet state and are subsequently dried prior to packaging. The dried casings have good mechanical properties in terms of tensile strength, burst strength, hoop strength and bite resistance. Whilst the conventional collagen casing in its wet state to some extent approximates natural casings, generally the mechanical properties are inadequate.

In one conventional process for producing collagen casings, acid collagen gel obtained from hide splits is extruded to form a continuous tube, hardened using ammonia and washed. The collagen gel may include a proportion of cellulose. The casing is partially dried by passing through a bath containing sodium carboxymethyl cellulose as a drying agent and glycerol as a humectant. The casing is then mechanically dried in a hot air oven before being shirred and packaged.

In another known process as disclosed in patent specifications GB 991183, U.S. Pat. No. 3,235,641 and U.S. Pat. No. 3,579,358, the collagen gel is extruded into a salt bath (containing for example ammonium sulphate or sodium chloride) and is then tanned using an alum bath. The wet casing is then mechanically dried.

U.S. Pat. No. 3,930,035 discloses extruding the collagen gel into a coagulating salt bath. The casing is then passed into a first tanning bath comprising aluminium sulphate and sodium citrate. It is then passed into a second tanning bath containing glutaraldehyde.

However, the processing conditions disclosed in these prior specifications aim at producing a collagen casing which is to be air dried prior to packaging and use. They do not address the problem of providing a wet casing of sufficient strength to be used in the wet state.

It is an object of the present invention to mitigate these problems and to provide a casing of adequate mechanical properties for use in the wet state.

SUMMARY OF THE INVENTION

The present invention provides a wet edible collagen casing which has been continuously formed and cross-linked, such that the casing has mechanical properties allowing the casing to be filled in its wet state, the casing being packed in its wet state ready for use.

By "wet" condition we mean that the casing has a high water content compared with conventional dried collagen casings used for sausages. Typical mechanically dried conventional casings have a water content in the region 15 to 25%. The wet collagen casing of the present invention may have a water content of 50 to 90%, preferably 70 to 90% by weight.

The collagen casing packed in its wet condition may be stored in brine and suitable additional bacteriocides may be added if required.

However, in a preferred embodiment the collagen casing is packed in its wet state (i.e. at a high moisture content) but is not surrounded by liquid. For example, the wet casing may be packed within a hermetically sealed pouch formed of a conventional material such as a plastics coated foil.

The wet casing of the present invention has mechanical properties which enable it to be filled and used in a manner analogous to natural gut. However, the present wet casing has the advantage of greater uniformity of bore, can be produced in any desired length and is generally capable of being filled at faster speeds than natural gut casings. Using the present invention speeds of at least 150 links per minute may be achieved using a Handtmann FA30 or PA30 sausage filling machine.

Generally the wet casing has a solids content of 15 to 30%, preferably 20 to 25% by weight, the balance being water; in comparison to a value of about 10 to 30% by weight for washed unsalted natural gut (but typically 15–25% by weight). The collagen content of the wet casing is usually 9 to 14% by weight; which is comparable to natural gut. Cellulose may be included; but where high collagen contents are required, the cellulose content may be reduced or omitted.

Usually the balance of the solids content is comprised of salt e.g. sodium chloride, in an amount of 5 to 15% of the total weight.

The present invention also provides a process for the production of a wet edible collagen casing which comprises:

forming an aqueous collagen gel into a continuous casing;

cross-linking the casing by use of a cross-linking agent;

treating the casing with a salt solution to remove water and to reduce the wall thickness of the casing; and packing the casing in the wet state.

Preferably, the collagen gel is an acidic gel having a pH in the range 2 to 5. It may also include conventional additives such as polyols (e.g. glycerol and sorbitol), modified celluloses, charged polysaccharides (e.g. sodium carboxyalkylcelluloses) or uncharged polysaccharides (e.g. hydroxypropyl methyl cellulose).

The acid collagen gel may be produced using known techniques such as by subjecting limed hide splits to washing, decalcification, mincing, grinding with water and acidifying to produce a fibrillar gel; or by washing, decalcifying, acidifying and grinding (e.g. using Fryma grinder) followed by kneading with a controlled amount of water to form a more fibrous gel (e.g. for use in larger diameter casings).

Usually, the gel contains 3 to 12 wt % collagen, preferably 4.5 to 10 wt %.

The casing may be continuously formed by extrusion, spinning or other known means.

The casing may be hardened in conventional manner by passing a mixture of air and ammonia into the lumen of the casing and maintaining an ammonia atmosphere around the outside.

The cross-linking agent may be any acceptable cross-linking agent known in the art but is preferably a dialdehyde such as glutaraldehyde or glyoxal, or a multivalent metal ion such as aluminium. In a preferred embodiment, the cross-linking agent is present in an aqueous solution through which the casing is passed; and is for example an aqueous solution of 10 to 3000 ppm glutaraldehyde, preferably 25 to 200 ppm, and the residence time of the casing is from 2 to 10 minutes, preferably 4 to 8 minutes. The aqueous glutaraldehyde bath is usually at a pH 5 to 10, preferably 8 to 10. Alternatively, the cross-linking agent may be included in the gel prior to extrusion; for example in an amount of 0.1 to 0.6 wt % in the case of glutaraldehyde.

After cross-linking, the casing may be partially chemically dried employing a carboxymethyl cellulose or sodium alginate solution. The solution preferably comprises 0.5 to 2.5% weight of the chemical dying agent and is preferably used at a temperature of 15° to 50° C.

The casing is treated with a salt solution to reduce the wall thickness of the casing, such that the thickness approaches that of natural casings of the same overall diameter. Typically, the wall thickness is reduced from 0.3–0.6 mm down to 0.1 to 0.2 mm. The salt may be any suitable salt known in the art but is preferably sodium chloride. Advantageously, the salt solution comprises 10 to 25% by weight of salt. Salt treatment may be carried out at 15° to 35° C., elevated temperatures aiding dehydration.

The salt solution also has the effect of improving the feel of the casing and thereby improving its handleability. It may also improve the clarity of the casing.

The casing may be subjected to a heat shrink treatment for a time (e.g. 2 to 30 seconds) and at a temperature (e.g. 70° to 95° C., preferably 80° to 90° C.) which reduces its volume and may remove water from the casing. This may be manifested as a reduction in length of the casing or its width (in the flat state), or even its thickness. The treatment is carried out at a temperature above the so called "heat shrink" temperature of the collagen. Shrinkage of collagen at elevated temperature is a well known phenomenum (see for example, "Chemistry and Technology of Leather", F. O'Flaherty, W. T. Roddy and R. M. Lollar, published by Robert Krieger, Chapter 16).

This temperature will depend on the degree of cross-linking of the collagen but can be determined by routine experimentation. Generally, lower temperatures will require long times, and vice versa, in order to provide an effective heat shrink treatment.

The heat shrink treatment is generally carried out in a water bath, and tends to increase the elasticity of the casing thereby more closely approximating natural casings, and also to improve its tensile strength. The heat treated casing thus behaves more similarly to natural gut casing.

The strength of the casing may be measured by the so-called "burst height" (as defined herein). Preferably the casings of the present invention have a burst height of at least 120 cm, preferably at least 150 cm. Increased burst heights are desirable since the casings have a reduced tendency to burst on filling.

The elasticity of the casing may be estimated by the "blow value" (as defined herein). Preferred blow values are at least 30 cm, preferably at least 40 cm, and especially at least 50 cm. Increased elasticity tends to more closely approximate the handling and filling properties of natural gut casings.

The wall thickness and mechanical properties of the casing of the invention will tend to be chosen to correlate with those of the equivalent natural product. For example, the properties may be chosen to correlate those of small diameter natural gut from a particular animal, or larger diameter gut from a larger animal. The finished wall thickness will usually be in the region 0.05 to 0.3 mm depending on the diameter of the casing.

The casing is then packed in its wet state usually by either shirring, spooling or reeling the casing. Shirring means that the casing is accummulated in a rouched manner on a cylindrical former in a discrete length, typically 15 to 50 meters, and then removed from the former. The term spooling means that the casing is shirred onto a length of pipe, typically a plastic pipe, which is adapted to fit over a stuffing horn so that the length of casing may then be filled in a single continuous manner. The casing might also be reeled, that is to say, wound up in its flat state.

While reference has been made to sausages, the collagen casing of the present invention may be filled with other foodstuffs, such as hamburger meat, cheese based fillings or vegetarian fillings.

The present invention avoids any costly mechanical drying step. Mechanical drying refers particularly to air drying or infra-red drying or equivalent means which are currently used in the production of existing dried collagen casings. In the present invention mechanical drying is avoided and thus the production energy costs are lower for the wet casing of the present invention than for standard dried collagen casings. Thus, using the present invention it is possible to produce wet casings which are similar to natural casings but at a cost which is comparable to that of natural hog gut. Using the present invention, the customer who normally prefers natural gut casing may be provided with a collagen product which has the advantages of uniform thickness and better diameter control whilst having substantially the appearance and feel of natural gut casings.

DETAILED DESCRIPTION OF PREFERRED EMBODIMENTS

Figure 1:
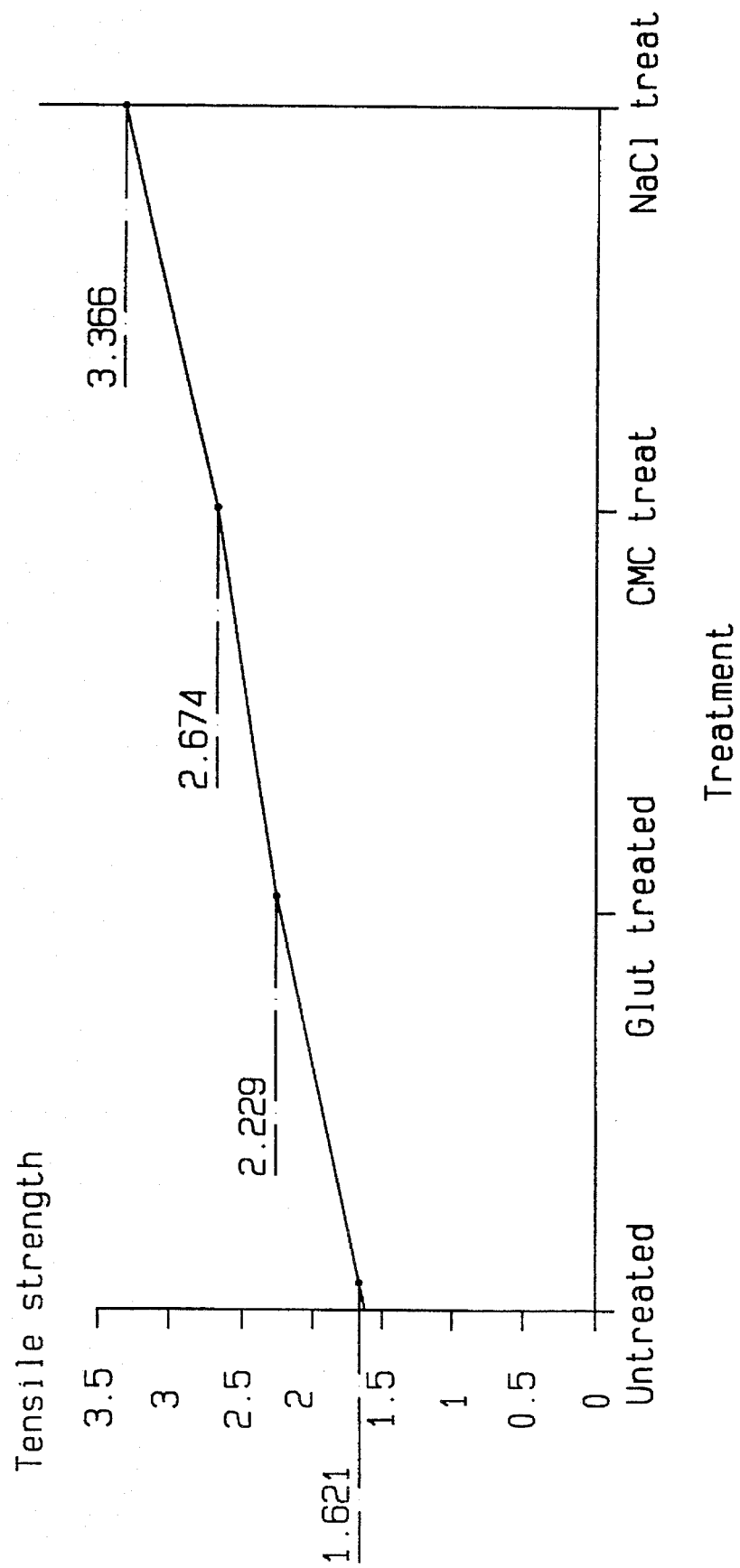
Figure 2:
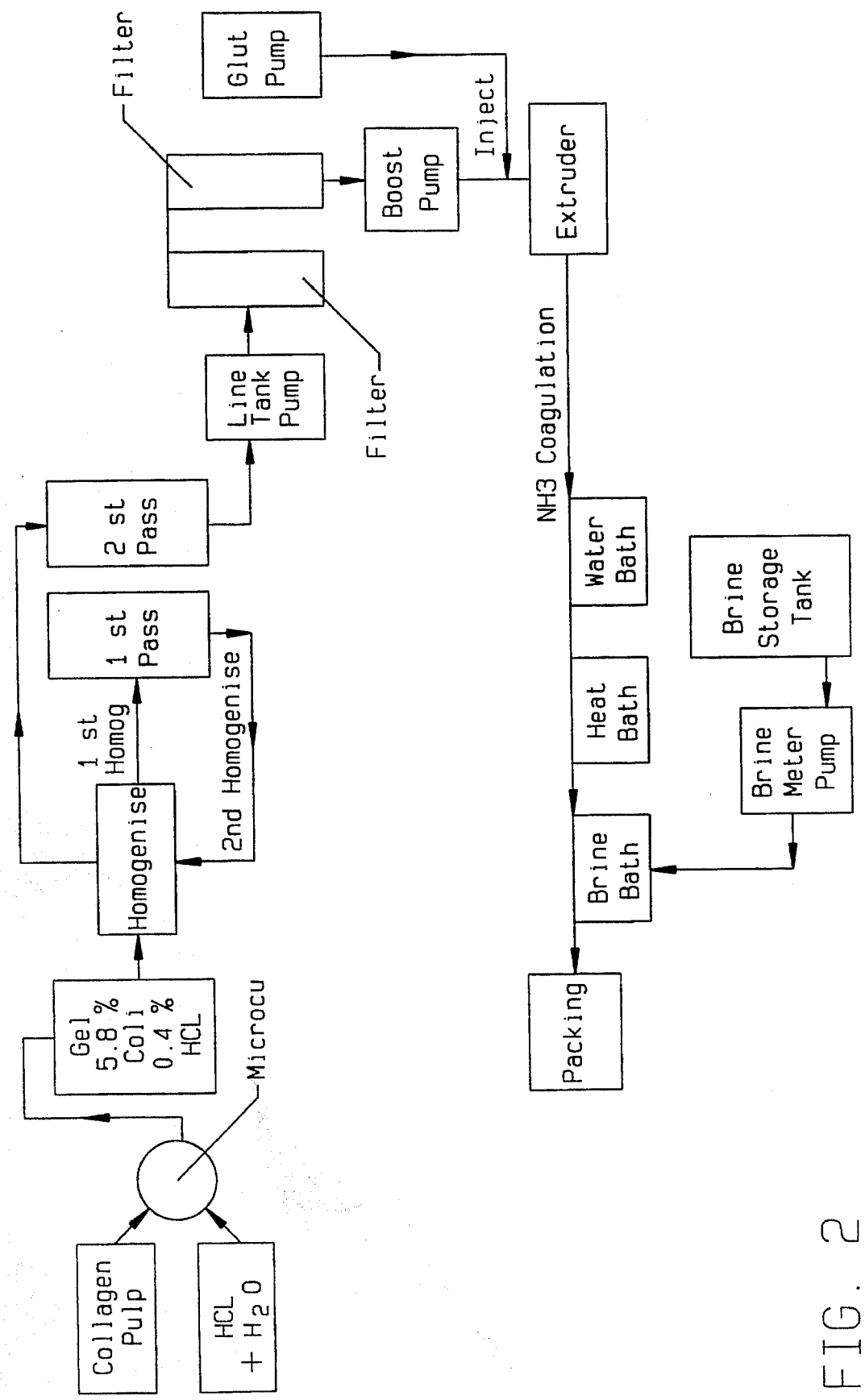

The present invention will now be described by way of example only in conjunction with the following example and drawing wherein:

FIG. 1 shows the variation in tensile strength of a cross-linked casing during production as described in Example 1; and FIG. 2 is a block flowchart of the process described in Example 4.

EXAMPLE 1

Limed hide splits (i.e. the lower corium of the hide) were washed, decalcified with ammonium sulphate and citric acid, minced, ground and mixed with hydrochloric acid to produce a fibrillar collagen gel of pH 2.0 comprising approximately 6% collagen, 0.4% hydrochloric acid and 93.6% by weight water. The gel is aged by standing for one or two days, homogenised and then filtered. The gel is then passed through an extruder so that a tube is extruded. A mixture of air and ammonia gas is blown into the lumen of the tube at the extruder end, whilst the exterior of the tube is passed through an atmosphere which is primarily ammonia. At the end of the ammonia chamber the tube is flattened by nip rollers and passed through a water bath which washes the casing. The residence time in the water bath is 20 minutes and the solids content of the casing 6 to 8% by weight. The typical tensile strength is approximately 1.5 kg.

The casing is then passed through a bath containing 100 to 200 ppm glutaraldehyde for approximately 8 minutes in order to cross-link the collagen.

Next the casing is passed through a chemical drying bath comprising 2% weight sodium-carboxymethyl cellulose (CMC) at 35° C. for 20 minutes to remove water from the casing. The solids content is from 12 to 14% weight collagen. The tensile strength is approximately 2 to 2.5 kg.

The casing is then treated by passage through a bath comprising 20% aqueous sodium chloride at ambient temperature for 30 minutes which removes further water from the casing. The solids content of the casing is 11 to 14% weight collagen together with 10 to 14% weight sodium chloride. The tensile strength is approximately 2.5 to 3.5 kg. The wall thickness is approximately 0.14 mm.

Then the wet casing is removed from the bath and spooled in the wet condition on a plastic cylinder holding approximately thirty meters of wet casing. The wet casing is then packed in a sealed pouch and is ready for sale.

Table 1 shows typical compositions of wet casings according to the invention compared to natural hog and sheep gut casings (washed and unwashed).

TABLE 1

|  | % NaCl | % Collagen | % Solids |
|---|---|---|---|
| Invention 1 | 12.72 | 10.74 | 23.32 |
| Invention 2 | 12.87 | 9.91 | 21.99 |
| Comparison |  |  |  |
| (A) washed hog gut | 17.46 | 12.03 | 32.53 |
| (B) washed sheep gut | 8.24 | 12.47 | 25.64 |

Table 2 shows the variation of solids content during the production process of the invention.

TABLE 2

| (Solids Profile) | | |
|---|---|---|
|  | Collagen wt % | NaCl wt % |
| (i) pretreatment | 7.7 | 0.01 |
| (ii) glutaraldehyde-treated | 7.5 | 0.01 |
| (iii) CMC - treated | 10.4 | 0.01 |
| (iv) NaCl-treated final product | 10.9 | 12.7 |

Table 3 shows various physical properties of the wet casing (compared to hog gut) for 28 mm diameter casings.

TABLE 3

| (Physical Testing) | | |
|---|---|---|
|  | Wet casing (invention) | Hog Gut |
| Tensile strength (cold) kg/cm$^2$ | 3.0–3.2 | 1.63 |
| Tensile strength (hot acid) kg/cm$^2$ | 3.0 | 1.36 |
| Weight g/m | 16 | 8 |
| Thickness microns | 75–100 | 25–35 |

Both casings were capable of being filled at full speed on Handtmann FA30 or PA30 filling machines.

EXAMPLE 2

Limed hide splits, or other suitable collagen sources were washed, delimed with $CO_2$/ammonium sulphate and citric acid/Na citrate, minced, ground and mixed with hydrochloric acid to produce a fibrillar collagen gel of pH 2.0 comprising approximately 5% collagen, 0.25% hydrochloric acid and 94.75% by weight water. The gel is aged by standing for one or two days, homogenised and then filtered. The gel is then passed through an extruder so that a tube is extruded. A mixture of air and ammonia gas is blown into the lumen of the tube at the extruder end, whilst the exterior of the tube is passed through an atmosphere which is primarily ammonia. At the end of the ammonia chamber the tube is flattened by nip rollers and passed through a water bath which washes the casing. The residence time in the water bath is 20 minutes and the solids content of the casing 6 to 8% by weight. The typical tensile strength is approximately 1.8 kg.

The casing is then passed through a bath containing 50 to 100 ppm glutaraldehyde for approximately 8 minutes in order to cross-link the collagen.

Next the casing is passed through a chemical drying bath comprising 2% weight sodium carboxymethyl cellulose (CMC) at 35° for 20 minutes to remove water from the casing. The solids content is from 12 to 14% weight collagen. The tensile strength is approximately 2.5 to 3.5 kg.

The casing is then treated by passage through a bath comprising 20% aqueous sodium chloride at ambient temperature for 30 minutes to remove further water from the casing. The solids content of the casing is 12 to 14% weight collagen together with 12 to 14% weight sodium chloride. The tensile strength is approximately 3.5 to 4.0 kg. The wall thickness is approximately 0.2 mm.

Then the wet casing is removed from the bath and spooled in the wet condition on a plastic cylinder holding approximately thirty meters of wet casing. The wet casing is packed in a sealed pouch and is ready for sale.

Table 4 shows various physical properties of the wet casing (compared to hog gut) for 35 mm diameter casings.

TABLE 4

| (Physical Testing) | | |
|---|---|---|
|  | Wet Casing (invention) | Hog Gut |
| Tensile strength (cold) kg/cm$^2$ | 7.0–8.0 kg | 1.5–2.3 kg |
| Tensile strength (hot acid) kg/cm$^2$ | 6.0–7.0 kg | 1.3–1.6 kg |
| Weight g/m | 40 | 10 |
| Thickness microns | 125–150 | 30–35 |

Both casings were capable of being filled at full speed on Handtmann FA30 or PA30 filling machines.

EXAMPLE 3

(Liquid Coagulation)

Limed splits were washed, cut into portions, approximately 25 cm square, decalcified with hydrochloric acid and washed to remove salts for approximately 24 hours. The splits are comminuted and then acid swollen with hydrochloric acid to produce a gel of approximately 8–10% collagen, 0.8% HCl and 90% water. The gel is aged by standing for one or two days, kneaded, homogenised and filtered. The gel is then passed through an anular extruder into a saturated solution (40%) of ammonium sulphate at a pH of 9–9.5 so as to coagulate the gel. Ammonium sulphate solution is introduced to the lumen of the tube at the extruder and the diameter of tube is controlled by balancing internal and external flows. After coagulation the casing is flattened and then passed through a solution of 13% ammonium sulphate at pH of 8.5; and then through water baths for approximately 30 mins to wash the casing. The casing is then crosslinked by a solution of glutaraldehyde for approximately 10 minutes and transferred to a bath containing saturated brine solution to remove water from the casing. The solids content by weight of the casing is approximately 13–16% collagen with 10–15% of sodium chloride. The tensile strength is 7.0 kg and wall thickness is 0.25 mm. The wet casing is then spooled on a plastic cylinder designed for the length required. The spool is packed in a sealed pouch ready for use.

EXAMPLE 4

(Including Heat Treatment)

A flattened collagen casing, which had been treated with ammonia and washed in water, was produced in the general manner described in Example 1.

Collagen pulp and a water/acid mixture are blended together to form a gel of 5.80% collagen and 0.40% HCl. The gel then undergoes a double homogenisation at 4500 pounds per square inch with cooling.

However, in this case cross-linking with glutaraldehyde was carried out by injecting glutaraldehyde in an amount of 0.35 wt % into the gel just prior to extrusion. The degree of cross-linking produced was comparable to that produced by using a glutaraldehyde bath in Example 1.

The cross-linked casing is then passed through a hot water bath at a temperature of about 80° C. for 8–11 secs. in order to bring about a heat shrinkage of the collagen casing. This results in a shrinkage in the length dimension of the casing which results in a reduction of 20–40% in length. The width of the flattened tube was reduced by about 30%, but this was an elastic reduction—the original width being largely restored when the casing was finally filled with meat. The wall thickness of the casing was substantially unaffected.

Then the heat-shrunk casing is treated by passage through a brine bath comprising 20% aqueous sodium chloride at ambient temperature for 30 minutes.

The wet casing then removed from the brine bath and spooled or reeled; and is then packed in a sealed pouch ready for sale.

FIG. 2 is a flowchart showing the various steps of the process. The filter bank for filtering the gel comprises first and second wirewound filters of mesh size 0.006 and 0.004 inch (152 and 101 microns). Glutaraldehyde cross-linking agent is injected into the gel just upstream of a gel metering pump (not shown). Heat shrinkage is carried out by passing the casing through a heated water bath in the region 80°–95° C.

Tables 5 and 6 show the properties of various heat shrunk casings produced by variations of the heat shrink bath conditions.

Within each series of tests at specified casing widths, experimental conditions (such as the extruder operating parameters, weight of gel extruded per unit length etc.) are maintained constant so that a direct comparison is possible. However, conditions may vary between series of tests so that comparisons between different series may not be meaningful. Nevertheless, it is clear that the heat shrink treatment tends to shrink the length and width of the casing, to increase its energy to breaking; and to increase its tensile strength, burst height and blow value. A decrease in modulus and thus increase in elasticity is also observed.

In edibility tests, a panel found little perceived difference between the tenderness of the wet casings of the present invention and natural hog gut when the casings were filled with meat and cooked. The wet casings of the invention were able to be filled successfully.

Table 7 shows the improvement in mechanical properties as a function of increasing glutaraldehyde content in the extruded gel. The casing was heat shrunk for 12 sec. at 85° C. A general increase in all parameters is to be noted. However, levels of glutaraldehyde are preferably kept low to avoid undesirable residual unreacted glutaraldehyde in the finished casing.

Test Methods (a) The tensile strength and elongation (i.e. strain) was measured using an Instron 1122 testing machine following the manufacturers recommendations. Instron is a trademark. The collagen film is cut in either the machine direction (MD) or transverse direction (TD) using a dumbbell-shaped cutter. Each dumbbell-shaped sample of film is tested using the precalibrated Instron tester. The sample is clamped into the machine and sprayed with water. The Instron tester pulls the sample until it breaks and the data is stored in the computer memory of the tester. The testing procedure may be repeated on a number of samples to give a statistically significant result. The computer program calculates modulus, energy to break, percent strain and maximum load.

(b) The burst height is the height (cm) of a water column (and therefore the weight of water) that the collagen casing will support when closed at the bottom end before the casing bursts. The burst height is thus a measure of the strength of the casing in both the machine and transverse directions. It indicates the ability of the casing to be filled at high fill pressures. A metal tube of approximately the same diameter as the casing is inserted into the open end of a length of casing 2.5 to 3 meters long, and it is suspended from that end in a test rig. The lower end of the casing is knotted about 2.5 m below the top of the casing. Water at a rate of 1.5 l/min is fed into the upper end of the casing until the casing bursts. The highest point of the water in the casing prior to burst is recorded. The burst height is the height of the water from knot to highest point.

(c) The blow value is a measure of how much the casing expands when filled out with a given volume of water to simulate filling with meat etc. A high value suggests a low elasticity and a high modulus, giving rise to a more rigid filling performance. A low value can lead to problems of over expansion of the casing when filled. A metal tube of approximately the same diameter as the casing is inserted into the open end of a length (1 to 2 m) of collagen casing, and suspended from that end in test rig. The lower end of the casing is knotted and a clip attached to hold the knot. A predetermined volume of water dependent on the diameter of the casing (200 ml for 28 mm, 300 ml for 36 mm, and 400 ml for 40 mm) at 25° C. is quickly poured into the upper end of the casing. A timer is started as soon as the last of the water has been poured in. After exactly one minute the height of the column is marked. The distance (cm) between the knot and the marked height is the blow value.

(d) The hot acid tensile strength test is designed to measure the degree of cross-linking developed in the final casing. A 5 inch (128 mm) long sample of casing is immersed in about 500 ml of 0.1N HCl solution at 70° C. ±1° C. for 60 seconds. The sample is removed from the solution and clamped in clamps exactly 2 inches (51 mm) apart in an Instron tensile tester. The clamps are drawn apart in the tester at 500 mm/min until the sample breaks. The breaking strength is recorded. The test is repeated three times on the same sample and the average taken. The higher the breaking strength, the greater the degree of cross-linking of the collagen which has taken place.

TABLE 5

(heat treatment bath)

| Initial width* mm | Time sec | Temp °C. | % shrink (length) | Modulus** kg/mm² | max load kg | % strain | Energy to break kg · mm | final width* mm | Blow value cm |
|---|---|---|---|---|---|---|---|---|---|
| 44.5 | 5 | 70 | −1 | 35.7 | 5.50 | 26.5 | 53.8 | 44.7 | 40.0 |
|  | 5 | 80 | −6 | 35.7 | 5.57 | 25.0 | 52.1 | 42.3 | 42.7 |
|  | 10 | 70 | −4 | 33.4 | 5.62 | 29.6 | 53.7 | 42.7 | 42.3 |
|  | 10 | 80 | −8 | 32.0 | 5.74 | 33.7 | 67.2 | 43.0 | 42.3 |
| 49.0 | 5 | 70 | −4 | 33.4 | 5.08 | 26.6 | 52.6 | 47.0 | 33.0 |
|  | 5 | 80 | −9 | 32.8 | 5.20 | 30.1 | 55.2 | 46.3 | 33.3 |
|  | 10 | 70 | −2 | 31.1 | 5.20 | 30.9 | 56.9 | 47.3 | 33.7 |
|  | 10 | 80 | −36 | 20.0 | 6.08 | 55.4 | 104.9 | 42.0 | 44.3 |

*width of the flattened tube
*the elasticity is inversed proportional to the modulus.

TABLE 6

(effect of heat treatment)

| Initial Width* mm | Time sec. | Temp °C. | Cold Tensile kg/cm² | Hot Acid Tensile kg/cm² | Burst Height cm | Final Width* mm | Blow Value cm |
|---|---|---|---|---|---|---|---|
| 49.0 | none | none | 4.66 | 4.00 | 133.7 | 52.7 | 29.4 |
| 49.0 | 12 | 85 | 4.88 | 4.31 | 202.3 | 34.7 | 61.3 |

TABLE 7

(varying glutaraldehyde)

| Glutaraldehyde % wt of gel | Cold Tensile kg/cm² | Hot Acid Tensile kg/cm² | Burst Height cm | Width mm | Blow Value cm |
|---|---|---|---|---|---|
| Control | 1.16 ± 0.18 | 0.22 ± 0.04 | 50.7 ± 20 | 33.7 | 66.0 ± 0.4 |
| 0.175% | 3.73 ± 0.68 | 2.70 ± 0.52 | 112 ± 3 | 36.5 | 75.8 ± 0.7 |
| 0.350% | 4.86 ± 0.27 | 3.66 ± 0.47 | 120 ± 9 | 36.0 | 85.6 ± 1.1 |
| 0.540% | 4.20 ± 0.74 | 3.84 ± 0.43 | 130 ± 2 | 40.4 | 74.8 ± 1.3 |

We claim:

1. A wet edible collagen casing, having a moisture content of 50 to 90% by weight, which has been continuously formed and cross-linked such that the casing has mechanical properties allowing the casing to be filled in its wet state, the casing being packed in its wet state ready for use.

2. A wet casing according to claim 1 which has a solids content of 10 to 30% by weight, the balance being water.

3. A wet casing according to claim 1 which has a collagen content of 9 to 14% by weight.

4. A wet casing according to claim 3 wherein the balance of the solids content consists essentially of edible salt.

5. A wet casing according to claim 4 wherein the balance of the solids content comprises 10 to 15% by weight sodium chloride.

6. A wet casing according to claim 1 wherein the casing has a wall thickness of 0.1 to 0.2 mm.

7. A wet casing according to claim 1 which is capable of being filled at a rate of at least 150 sausage links per minute.

8. A wet casing according to claim 1 which has a burst height of at least 120 cm.

9. A wet casing according to claim 1 which has a blow value of at least 40 cm.

10. A wet casing according to claim 1 which has been heat shrunk.

* * * * *